United States Patent [19]

Cardy

[11] 4,376,153

[45] Mar. 8, 1983

[54] COMPOSITIONS COMPRISING VISCO-ELASTIC LIQUID COMPOUNDS

[75] Inventor: Charles F. Cardy, Luton, England

[73] Assignee: Interox Chemicals Limited, London, England

[21] Appl. No.: 264,841

[22] Filed: May 18, 1981

[30] Foreign Application Priority Data

Jun. 7, 1980 [GB] United Kingdom ............... 8018746

[51] Int. Cl.³ .................. B32B 17/10; C08F 8/14
[52] U.S. Cl. ........................... 428/430; 428/441;
428/483; 524/503; 525/57; 525/61; 525/386;
528/354
[58] Field of Search .............. 525/61, 57, 327, 386;
428/441, 430, 483; 528/354; 260/33.4 R, 33.8
R, 32.8 R, 37 R; 524/503

[56] References Cited

FOREIGN PATENT DOCUMENTS 2124853 9/1972 France .

Primary Examiner—J. Ziegler
Attorney, Agent, or Firm—Larson and Taylor

[57] ABSTRACT

Polyfunctional viscoelastic liquid compounds having molecular weights of at least 25,000 and preferably from 40,000 to 10 million comprise vinyl polymers having adducted thereon a plurality of groups, the same or different, the adducted groups having the general formula

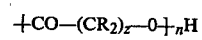

wherein R represents a low molecular weight organic radical or, preferably, hydrogen, the total number of carbon atoms in all occurrences of R not exceeding 12, z represents a whole number from 4 to 8, preferably 5, and n represents on average, a number from, preferably, 0.5 to 300 per vinyl unit of the vinyl polymer. The compounds are soluble in a wide range of organic solvents and can find applications in adhesives, tackifiers, and fillers such as mastics, putties and like compositions.

17 Claims, No Drawings

COMPOSITIONS COMPRISING VISCO-ELASTIC LIQUID COMPOUNDS

High molecular weight polyfunctional compounds having a visco-elastic liquid character, particularly if soluble in a range of organic solvents, would be of considerable utility in deformable and/or adhesive products such as adhesives, tackifiers and fillers such as mastics, putties and the like. The term "visco-elastic liquid" is used to denote a material which is liquid at ambient or at somewhat elevated temperature, for example up to about 100° C., and in the liquid state is viscous and shows resilience.

The present invention provides a range of high molecular weight polyfunctional compounds having a visco-elastic liquid character comprising polyester adducts onto vinyl polymers.

British Pat. No. 859,642 discloses the production of products usable as plasticisers and intermediates for preparing polyurethane elastomers the products being based on polyesters which have been polymerisation initiated by means of compounds containing reactive hydrogen atoms which compounds may be vinyl polymers. The products are easily pourable liquids, which, preferably have a molecular weight between about 2000 and 4000.

The polyfunctional viscoelastic liquid compounds provided by the present invention have molecular weights of at least 25,000 and comprise vinyl polymers having adducted thereon a plurality of functional groups, the same or different, having the general formula

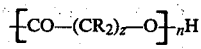

wherein R, in each occurence in the formula, represents either a hydrogen atom or a low molecular weight organic radical, the total number of carbon atoms in all occurences of R not exceeding 12, and wherein z represents a whole number having a value of from 4 to 8, preferably 5, and n represents a whole number. Preferably, the average value of n in the adducted groups is at least 0.5, particularly preferably at least 0.85, for example at least 1 and up to, for example, 300 or even 1000 or higher, per vinyl unit in the vinyl polymer. Preferably R, in at least half of its occurences in the general formula, particularly preferably in all of its occurences in the general formula, represents a hydrogen atom.

The compounds provided by the invention essentially have a high molecular weight. This is obtainable by control of the molecular weight of the polymer and of the adducted groups, and of the proportion of the vinyl units in the polymer occupied by adducted groups. The particular combination of these features also tends to determine product characteristics. To attain the required viscoelastic liquid character it may be necessary for the molecular weight to be in excess of 25,000 and, for example, very suitably at least about 40,000 although some preferred products having molecular weights in excess of 100,000 and up to 10 million or higher are envisaged.

Preferably the vinyl polymer has a molecular weight of from 10,000 to 50,000, particularly preferably from 12,000 to 130,000 although, provided the molecular weight of the adducted groups is sufficient to attain the required high molecular weights vinyl polymers having molecular weights of as little as 1,000 or 2,000 may be used.

The number of terminal primary hydroxyl groups in the polyfunctional viscoelastic liquid compounds provided by the invention may be estimated from the "hydroxyl number" of the compounds. By "hydroxyl number" is meant the number of mg of KOH needed to neutralise the acetic acid formed when acetic anhydride and pyridine are reacted with 1 g of a compound, as described in standard textbooks.

It is thought that the particular character of the compounds is related to the presence of the plurality of groups of the above-stated general formula anchored at one end to the vinyl polymer the number of groups preferably being a substantial proportion, for example at least one half or more suitably at least two thirds, of the number of vinyl units in the vinyl polymer. The hydroxyl number of the compounds greatly depends on the average value of n in the general formula, the hydroxyl number being smaller for a given number of terminal hydroxyl groups where the average value of n is larger. However, generally, it is preferred that the hydroxyl number of the compounds, at least where the average value of n per vinyl unit in the vinyl polymer is no greater than 5, is greater than 60, preferably greater than 75, for example, desirably, at least 90. Where the average value of n in the adducted groups per vinyl unit of the general formula is greater than, for example substantially greater than, 5 the hydroxyl value of the compounds, due to the increase of the molecular weight of the groups of the first above-stated general formula, will be depressed. Nevertheless, where the average value of n per vinyl unit is from above 5 to 10 the hydroxyl value of the compounds is, preferably, at least 10.

The visco-elastic liquid compounds of the present invention may be prepared by conducting, under suitable conditions, the ring-opening polymerisation of a lactone having the general formula

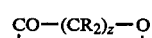

wherein R and z have the values above ascribed to them; the lactone being, preferably,

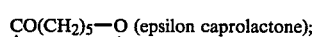

in the presence of a vinyl polymer having a plurality of groups reactive with the lactone, such as for example hydroxyl or amine groups, to initiate said polymerisation in the presence, if necessary, of a suitable catalyst.

Preferably, the groups reactive with the lactone are hydroxyl groups, and the vinyl polymer is polyvinyl alcohol.

It is found, however, that there are problems which must be overcome if compounds having the required visco-elastic liquid character, a relatively high hydroxyl number and being otherwise suitable for use, are to be prepared.

The vinyl polymers commercially available having a plurality of reactive groups usually have been prepared by the emulsion polymerisation of a vinyl compound containing a reactive group or a group which may be converted to a reactive group in the final polymer by suitable further reaction. Commercial grades of polyvinyl alcohol are usually prepared by the emulsion polymerisation of polyvinyl acetate followed by alcoholic hydrolysis, for example by the use of methanolic sodium hydroxide.

Depending on the efficiency of the hydrolysis reaction there are residual acetate groups on a proportion of the vinyl units in the polymer such groups not being capable of initiating the ring opening polymerisation of lactones. Preferably, in the vinyl polymer used according to the present invention, the proportion of vinyl units bearing suitable reactive groups is as high as possible for example, preferably, at least 85%. Polyvinyl alcohol in which the proportion of vinyl units bearing hydroxyl groups is at least 88% and may be up to about 98%, is readily commercially available and is suitable for use according to the present invention.

The ring-opening polymerisation of a lactone, for example of the preferred lactone according to the present invention, may be conducted in the presence of a reactive initiator and, preferably, also in the presence of a suitable catalyst at temperatures, typically, of up to about 180° C. It is found, however, that compounds obtained by heating a mixture comprising the vinyl polymer containing a plurality of reactive side groups, for example polyvinyl alcohol, the lactone, for example epsilon caprolactone and the catalyst to reaction temperature often results in a product having a discoloured charred appearance, a high carboxyl number, possibly an undesirable odour and possibly an undesirably low hydroxyl value. By "carboxyl number" is meant the number of mg of KOH required to neutralise 1 g of the compounds according to the invention, using phenolphthalein as an indicator as described in standard textbooks. Preferably the compounds provided by the present invention have a carboxyl number below 20, particularly preferably below 10.

According to the present invention there is therefore also provided a process for the preparation of viscoelastic liquid compounds comprising forming a polymerisation mixture of a vinyl polymer having reactive groups capable of initiating the ring-opening polymerisation of a lactone, preferably hydroxyl groups, a lactone having the formula

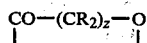

wherein R and z have the values above ascribed to them, preferably epsilon-caprolactone, and a catalyst and heating the mixture to cause the polymerisation reaction to proceed, wherein the vinyl polymer and the lactone have been treated to remove volatile materials therefrom before the catalyst containing reaction mixture is formed and the quantity of lactone is such that, the molecular weight of the resulting polymer would be at least 25,000.

The preferred features of the vinyl polymer and of the lactone are, suitably, as above described.

In carrying out the last mentioned process it is preferred that a mixture of the vinyl polymer and the lactone be treated to remove volatile materials therefrom. The volatile materials are preferably removed from the vinyl polymer and the lactone under reduced pressure. Preferably, the vinyl polymer and lactone are heated during the treatment to remove volatile materials at a temperature below 100° C., particularly preferably below 90° C. for example, desirably, not more than 80° C. there being a tendency, increasing progressively at temperatures increasing above 80° C., for the lactone to react with any water present with consequent adverse characteristics, for example a high carboxyl number, in the final product. The vinyl polymer and lactone may be treated to remove volatiles therefrom at ambient temperature if a sufficiently reduced pressure is used. For convenience, however, the vinyl polymer and lactone are heated to at least 50° C., preferably at least 60° C., during the said treatment. At the preferred treatment temperature of at least 50° C. the duration of the treatment to remove volatile materials is, suitably, at least 0.5 hours, for example up to 5 hours and the reduced pressure is, suitably, less than 200 mm Hg absolute particularly preferably less than 100 mm Hg, for example less than 50 mm Hg and suitably selected consistent with the need to avoid unduly violent emission of volatile materials which might cause losses of the vinyl polymer and lactone from the containing vessel. Preferably, the vinyl polymer and lactone are subjected to sparging with a chemically inert gas, such as nitrogen, during the treatment to remove volatile materials therefrom.

Preferably, the water content of the treated vinyl polymer and lactone is below 0.1% particularly preferably below 0.05%, by weight, as determined by the Karl Fischer method.

A mixture of the vinyl polymer and the lactone, when suitably treated to remove volatile materials therefrom, is found to be stable and may therefore, if desired, be cooled and stored.

A catalyst for the polymerisation of the lactone in the presence of the vinyl polymer may be suitably selected from Lewis acids, organic acids, alkyl tin, alkyl titanium, or alkyl aluminium compounds or other suitable catalysts known in the art.

The polymerisation may be conducted at any suitable temperature subject to the suitable selection of a catalyst operable at that temperature. Preferably, the polymerisation is conducted at a temperature of at least 100° C., particularly preferably from 120° C. to 200° C. for example, suitably, from 125° C. to 185° C. At such temperatures the catalyst may, suitably, be an alkyl tin or an alkyl titanium compound, for example stannous octoate. Alternatively, the polymerisation may be conducted at a temperature below 125° C. in which case the catalyst may, suitably, be a Lewis acid, for example boron trifluoride. Some lower temperatures in the last mentioned range may not be preferred, however, if there is a tendency for premature thickening or solidification of the product in the reaction mixture and, in such an event a suitably higher polymeristion temperature, is desirably, selected. The quantity of catalyst is, preferably, from 0.001% to 1.0%, particularly preferably from 0.005% to 0.2% by weight of the vinyl polymer and lactone.

Preferably, the vinyl polymer or a mixture of the vinyl polymer and lactone contains an anti-oxidant to reduce, or prevent, any tendency for the vinyl polymer to decompose. Such an anti-oxidant may, for example, be butylated hydroxytoluene, or butylated hydroxyanisole or other suitable compounds known in the art. The quantity of anti-oxidant is, preferably, from 0.01% to 2.0%, particularly preferably from 0.05% to 1.0% by weight of the vinyl polymer and lactone.

Preferably the polymerisation of the lactone is conducted under reduced pressure of, for example, less than 200 mm Hg although, at the preferred temperatures, it may be necessary to select a pressure which will not cause loss of the vinyl polymer and lactone from the containing vessel.

Desirably, as large a proportion as possible of the volume of the vinyl polymer and lactone, and the polymerisation product as it is formed, is maintained in agitation. This helps to contribute to the production of compounds having a relatively high hydroxyl number. Suitably, since the vinyl polymer and lactone may tend to be somewhat viscous and the polymerisation product usually tends to be viscous even at temperatures substantially above its melting point a large working surface/low speed stirrer may be used, for example a worm stirrer.

The melting point of the visco-elastic compounds provided by the present invention, and their physical properties in both the solid and liquid states, for example their elasticity and stickiness, tend to be related to the average molecular weight of the vinyl polymer and the average length of the polyester chains, attached thereto, formed by polymerisation of the lactone that is, the average value of n in the general formula quoted above. In general compounds having a low average value of n, for example below 5, tend to be liquid at ambient temperatures while those with a high average value of n tend to be solids or rubbery materials at ambient temperatures converting to visco-elastic liquids at somewhat elevated temperatures, often at well below 100° C. The use of a low molecular weight vinyl polymer tends to give a product which is liquid at ambient temperature, subject to the effect of the length polyester chains attached thereto. The control of the process for the preparation of the visco-elastic compounds so as to attain particular desired product characteristics will be within the skill of those versed in the art.

Besides their unusual visco-elastic liquid properties the compounds according to the invention, unusually, tend to be soluble in a wide range of low molecular weight organic solvents, for example in ketone solvents, such as methyl ethyl ketone or acetone, in alcohol solvents, such as ethyl alcohol or isopropyl alcohol, or in methylene chloride, industrial methylated spirits or the like. The compounds according to the invention also, unusually, tend to show strong adhesion for smooth surfaces such as those of glass, or of polymeric material such as polyethylene, polypropylene, polyvinyl chloride or the like, or human skin, and may be used as such, as adhesives for such materials. The products of the invention having relatively higher melting points may be used as hot melt adhesives. Another application for adhesives according to the invention is in surgical dressings.

In the light of the properties of the compounds provided thereby, the present invention further provides deformable filling products such as, for example, tackifiers, mastics, putties, sealants. Such products may contain other ingredients normally used in their manufacture such as, for example fillers such as, for example, chalk, pigments, such as for example, titanium dioxide or other suitable inorganic oxide or solvents such as, for example, those mentioned above.

The invention will now be illustrated by means of the following examples.

The procedure followed in conducting the examples was a follows.

Polyvinyl alcohol and epsilon caprolactone together with 0.1%, by weight of the polyvinyl alcohol and epsilon caprolactone, of butylated hydroxyanisole were placed in a reaction vessel which was mounted in an electric heating mantle and fitted with a worm stirrer, a thermometer, electronic temperature control means and nitrogen sparge means.

The contents of the vessel were stirred slowly under a vacuum of 30 mm Hg the nitrogen sparge being in operation and the temperature in the vessel being raised to 80° C. over approximately 60 mins. This temperature was maintained until the water content of the reactants had fallen to 0.03%. The vacuum was momentarily released and 0.5 g stannous octoate catalyst was introduced, the stirring and nitrogen sparge thereafter being continued and the temperature being increased to 155° C. over approximately 2 hours and then being maintained at that level, the vacuum being diminished as necessary to avoid loss of material. After the addition of the catalyst and during the subsequent heating the reactants gradually formed a weak gel and then became liquid once more. At this point the temperature was raised to 180° C. over approximately 2 hours and maintained at this level until the reaction had gone substantially to completion as determined by gas liquid chromatography for residual caprolactone. The product was then discharged and cooled.

The reactants used, and their relative proportions, in each of a series of Examples, and certain properties of the products, are set out in Table 1.

In Table 1 the following abbreviations are used.

| | | |
|---|---|---|
| Ex | = | Example |
| PVA | = | polyvinyl alcohol |
| M. wt | = | approximate average molecular weight |
| % hyd | = | % degree of hydrolysis |
| M/OH | = | Molecules/hydroxyl group of PVA |
| OH Number | = | hydroxyl number |

The acid number and the hydroxyl number are stated in mg KOH/g product.

The polyvinyl alcohol used was from a variety of commercial sources. The identity of the supplier of the polyvinyl alcohol used in the examples is:

| Example | 1–5 | British Drug Houses |
|---|---|---|
| " | 6–9 | Koch |
| " | 10,13 | Kuraray |
| " | 11,12,14,17 | Hoechst |

TABLE 1

| | PVA | | | Caprolactone | | Product | |
|---|---|---|---|---|---|---|---|
| Ex | M. wt | % hyd. | g | g | M/OH | OH Number | Acid Number |
| 1 | 14,000 | 98 | 557.3 | 1442.7 | 1 | 323.8 | 1.87 |
| 2 | 14,000 | 98 | 280 | 1720 | 2.4 | 163.6 | 0.66 |
| 3 | 14,000 | 98 | 28 | 1972 | 27 | — | — |
| 4 | 14,000 | 98 | 6.97 | 1993 | 109 | — | — |
| 5 | 14,000 | 98 | 3.49 | 1996.5 | 219 | — | — |
| 6 | 72,000 | 98 | 558 | 1442 | 1 | — | — |
| 7 | 72,000 | 98 | 324 | 1676 | 2 | 182.7 | 0.74 |
| 8 | 72,000 | 98 | 280 | 1720 | 3 | 131.66 | 0.66 |
| 9 | 72,000 | 98 | 144 | 1856 | 4.97 | — | — |
| 10 | 77,000 | 88 | 298.5 | 1701.5 | 3 | 156 | 9.06 |
| 11 | 89,000 | 88 | 228 | 1772 | 1.76 | 136.6 | 0.61 |
| 12 | 89,000 | 88 | 157 | 1432 | 3.5 | 89.7 | 0.93 |
| 13 | 107,800 | 88 | 184.9 | 1815.1 | 4 | 110.9 | 7.92 |
| 14 | 111,100 | 88 | 359.7 | 1640.29 | 1.76 | 173.6 | 0.69 |
| 15 | 111,100 | 88 | 148 | 1690 | 4.39 | — | 0.95 |
| 16 | 123,000 | 88 | 298 | 1701 | 2.2 | 149.2 | 8.2 |

TABLE 1-continued

| | PVA | | | Caprolactone | Product | | |
|---|---|---|---|---|---|---|---|
| Ex | M. wt | % hyd. | g | g | OH M/OH | Num-ber | Acid Number |
| 17 | 123,000 | 88 | 176 | 1824 | 4 | 88.3 | 2.51 |

The products of Examples 1, 2, 8, 9, 11, 12, 14, 15, 16 and 17 were viscoelastic liquids at room temperature (20° C.) the products of Examples 9, 12, 15 and 17 eventually solidifying on standing, but were returnable to the liquid state by heating.

The products of Examples 3, 4, and 5 were solid at room temperature but had melting points at approximately 60° C. to give viscoelastic liquids.

The products of Examples 6, 7, 10 and 13 were resilient rubbery solids at room temperature butmelted at temperatures below 100° C. to give viscoelastic liquids.

Two experiments were conducted to determine the effect of omitting the step of removing volatile materials from the vinyl polymer and lactone. The experiments were conducted at atmospheric pressure and without a nitrogen sparge. The reactants, additives, quantities and procedure were as used in the Examples except as differently described. The reactants, catalyst and anti-oxidant were mixed at room temperature and brought to a temperature of 180° C. over approximately 2 hours. In one experiment the Kuraray polyvinyl alcohol of 24, 200 molecular weight was used together with sufficient epsilon caprolactone to provide an average of 1.5 molecules per hydroxyl group. In the other experiment polyvinyl alcohol of 77,000 molecular weight from the same supplier was used together with sufficient epsilon caprolactone to provide an average 3 molecules per hydroxyl group.

In both experiments there were problems due to the formation and persistance of jelly-like masses during the polymerisation reaction and the product was badly discoloured and charred and had an acid number of over 30. The procedure used in these two experiments is apparently not useable to give a satisfactory product.

The following tests on the solubility of the product of certain of the Examples were condensed. In each case a small sample of product was taken on a glass rod and immersed in about 15 cc of solvent in a flask at room temperature. The flasks were occasionally inverted momentarily. Table 2 indicates the solvent used and whether the sample had completely dissolved within 24 hours (<24) or, if not disolved in that time, within 48 hours (<48) or over a time of more than 48 hours (>48).

| Example | Acetone | Iso-propyl alcohol | Methylene chloride | Industrial Methylated Spirits. |
|---|---|---|---|---|
| 1 | <24 | <24 | <24 | <24 |
| 2 | <24 | <48 | <24 | <24 |
| 7 | <24 | >48 | <24 | <24 |
| 8 | <48 | <24 | <24 | >48 |
| 11 | <24 | <48 | <24 | <24 |
| 14 | <24 | <24 | <24 | <24 |

Compounds according to the invention such as that of Example 1 when mixed with 10% by weight of talc in a 'Z' blade mixer gave a putty-like product with good adhesion to surfaces such as glass, metal or painted wood. The surface of the product becomes non-sticky on standing so that, thereafter dirt or dust does not adhere to the products. On applying shear by working the product, it again becomes sticky and usable as a putty. Such a product might be used for temporarily affixing objects to glass, or paper notices to walls and is found not to damage such surfaces on removal.

A similar putty-like product may be made from the compound of Example 2 using 20% of talc by weight of the compound. Replacing the talc in either above putty with titanium dioxide more rubbery products are obtained which can be made into workable mastics by the inclusion of a solvent such as, for example, isopropyl alcohol.

What is claimed is:

1. A composition comprising a polyfunctional viscoelastic liquid compound having a molecular weight of at least 25,000 and comprising a polyvinyl alcohol polymer in which at least half of the vinyl units of the vinyl polymer have adducted thereon a plurality of functional groups having the general formula $\{CO-(CR_2)_z-O\}_n H$ wherein R, in each occurrence in the formula, represents either a hydrogen atom or an organic radical, the total number of carbon atoms in all the occurrences of R not exceeding 12, z represents a whole number having a value of from 4 to 8 and n represents a whole number having an average value of at least 0.5 per vinyl unit of the polyvinyl alcohol polymer.

2. A composition as claimed in claim 1 wherein the polyfunctional compound has a molecular weight of at least 40,000.

3. A composition as claimed in claim 2 wherein the polyfunctional compound has a molecular weight of up to 10 million.

4. A composition as claimed in claim 2 wherein the polyvinyl alcohol has a molecular weight of from 10,000 to 50,000.

5. A composition as claimed in claim 4 wherein the average value of n in the general formula is from 1 to 300.

6. A composition as claimed in claim 1 wherein the polyvinyl alcohol polymer has a molecular weight below 10,000 and the average value of n in the general formula is from 2 to 1,000.

7. A composition as claimed in claim 1 wherein the average value of n in the general formula is no greater than 5 and wherein the hydroxyl value of the polyfunctional compound is greater than 75.

8. A composition as claimed in claim 1 wherein the average value of n in the general formula is from greater than 5 to 10 and the hydroxyl value of the polyfunctional compound is at least 10.

9. A composition as claimed in claim 1 wherein in the general formula R in every occurence, represents a hydrogen atom and z represents the number 5.

10. A composition as claimed in claim 1 which is an adhesive.

11. A composition as claimed in claim 10 which is adherent to glass, or to an organic polymeric material.

12. A composition as claimed in any one of claims 1 to 9 further comprising at least one additive selected from the group consisting of fillers, pigments and solvents.

13. A process for the production of a polyfunctional viscoelastic liquid compound having a molecular weight of at least 25,000 and comprising a polyvinyl alcohol polymer in which at least half of the vinyl units of the polyvinyl alcohol polymer have adducted thereon a plurality of functional groups having the general formula $\{CO-(CR_2)_z-O\}_n H$ wherein R, in each occurrence in the formula, represents either a hydrogen atom or an organic radical, the total number of carbon atoms in all the occurrences of R not exceeding 12, z represents a whole number having a value of from 4 to 8 and n represents a whole number having an average value of at least 0.5 per vinyl unit of the polyvinyl alcohol polymer, said process comprising forming a polymerisation mixture of polyvinyl alcohol a lactone having the formula

wherein R and z have the values above ascribed to them, and a catalyst, and heating the mixture to cause the polymerisation reaction to proceed, wherein the polyvinyl alcohol polymer and the lactone have been treated to remove volatile materials therefrom before the catalyst containing reaction mixture is formed and the quantity of lactone is such that the molecular weight of the resulting polymer would be at least 25,000.

14. A process as claimed in claim 13 wherein the mixture is heated to below 90° C.

15. A process as claimed in claim 14 wherein the mixture is heated at an absolute pressure of less than 200 mm Hg.

16. A process as claimed in claim 15 wherein the mixture is heated for at least 30 minutes.

17. A process as claimed in claim 13 wherein the mixture is sparged with a chemically inert gas while it is being heated.

* * * * *